United States Patent [19]

Beck et al.

[11] Patent Number: 5,302,708
[45] Date of Patent: Apr. 12, 1994

[54] WATER-SOLUBLE PHTHALOCYANINE DYES

[75] Inventors: Thomas Beck, Bad Soden am Taunus; Werner H. Russ, Flörsheim am Main; Hartmut Springer, Königstein/Taunus; Marcus Bänfer, Bad Soden am Taunus, all of Fed. Rep. of Germany

[73] Assignee: Hoechst Aktiengesellschaft, Frankfurt, Fed. Rep. of Germany

[21] Appl. No.: 926,589

[22] Filed: Aug. 6, 1992

[30] Foreign Application Priority Data

Aug. 9, 1991 [DE] Fed. Rep. of Germany ....... 4126395

[51] Int. Cl.$^5$ .................. C07F 15/04; C09B 47/30
[52] U.S. Cl. ................... 540/123; 540/124; 540/125; 540/126; 540/127; 540/131; 540/132; 540/133; 540/135
[58] Field of Search ............. 540/123, 124, 125, 126, 540/127, 129, 132, 133, 128, 140; 8/661

[56] References Cited

U.S. PATENT DOCUMENTS

| | | | |
|---|---|---|---|
| 3,047,582 | 7/1962 | Bienert et al. | 8/661 |
| 3,062,831 | 11/1962 | Freyermuth et al. | 260/314.5 |
| 3,238,221 | 3/1966 | Schmitz et al. | 260/314.5 |
| 3,301,814 | 1/1967 | Parry | 528/112 |
| 4,033,980 | 7/1977 | Meininger et al. | 540/128 |
| 4,237,050 | 12/1980 | Springer | 540/123 |
| 4,350,632 | 9/1982 | Springer | 540/134 |
| 4,745,187 | 5/1988 | Springer | 540/123 |

FOREIGN PATENT DOCUMENTS

| | | |
|---|---|---|
| 0043561 | 1/1982 | European Pat. Off. |
| 0231837 | 8/1987 | European Pat. Off. |
| 1288071 | 2/1962 | France |
| 1297953 | 5/1962 | France |
| 1370455 | 7/1964 | France |
| 1055984 | 10/1963 | United Kingdom |

OTHER PUBLICATIONS

Hashizume et al., Chemical Abstracts vol. 62, 1965, Abstract 16422g.

Primary Examiner—Mukund J. Shah
Assistant Examiner—P. K. Sripada
Attorney, Agent, or Firm—Connolly and Hutz

[57] ABSTRACT

Phthalocyanine dyes, in particular copper phthalocyanine and nickel phthalocyanine dyes which contain one or more groups of the formula given and defined below

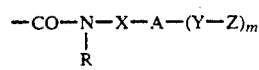

or one or more carboxy groups or both groups and which furthermore can contain one or more sulfo groups, customary sulfonamide groups and/or groups of the formula given and defined below

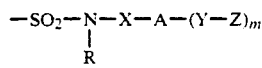

dye hydroxy- and/or carboxamide-containing materials, in particular fiber materials, such as cellulose fiber materials, wool and polyamide fibers, in fast, predominantly green hues of high color strength.

In the formulae: R is hydrogen or a lower substituted or unsubstituted aliphatic radical, A is an aromatic carbocyclic or aromatic heterocyclic radical or an alkylene radical, which may be interrupted by 1 or 2 hetero groups, X is a direct bond or a divalent organic bridging member or together with the group —N(R)— forms the divalent radical of a saturated heterocycle containing two N atoms, Y, in the case where A is an aromatic radical, is a direct bond or a carbamoylalkylene group or a methylene, ethylene, methylamino or β-cyanoethylamino group, or Y is lower alkylene, in which case the grouping —X—A— must be a direct bond and m is 2, Z is a fiber-reactive group of the vinylsulfonyl series and m is the number 1 or 2.

9 Claims, No Drawings

WATER-SOLUBLE PHTHALOCYANINE DYES

The invention is in the technical field of fiber-reactive dyes.

The dyeing practice using reactive dyes has recently led to increased demands on the quality of the dyeings and the economy of the dyeing process. As a result, there is still a need for new reactive dyes, not only with respect to the fastness properties of the dyeings obtainable therewith but also with respect to an increased degree of fixation of the dyes on the material to be dyed. Fiber-reactive phthalocyanine dyes are disclosed, for example, in U.S. Pat. Nos. 4,237,050, 4,350,632 and 4,745,187; they contain a fiber-reactive group from the vinyl sulfone series which is bound via an N-aryl- or N-alkylsulfonamide radical. Despite the excellent coloristic properties of these known dyes, it was desirable to develop dyes having an increased degree of fixation and producing dyeings having improved coloristic color strength.

The present invention has now made it possible to find new, water-soluble, improved phthalocyanine dyes which give brilliant green dyeings of high quality and have the formula (1) (both formula (1) and the formulae mentioned below are listed in formula sheets following the Examples).

In formula (1):

Pc is the radical of a metal-free or a metal-containing phthalocyanine, for example of copper phthalocyanine, cobalt phthalocyanine or nickel phthalocyanine, it being possible for the phthalocyanine radical to be additionally substituted in the 3 and/or 4 position of the carbocyclic aromatic rings of the phthalocyanine, for example, by halogen atoms, such as chlorine atoms, or aryl radicals, such as phenyl radicals, and in which the chlorosulfonyl, sulfonamide and/or sulfo groups are bound in the 3 and/or 4 positions of the carbocyclic aromatic rings of the phthalocyanine;

R is a hydrogen atom or a lower aliphatic radical, in particular a lower alkyl group, which may be substituted;

$R^1$ is a hydrogen atom or a lower alkyl radical, which may be substituted, or is a cycloalkyl radical having 5 to 8 carbon atoms, such as the cyclohexyl radical, and $R^2$ is a hydrogen atom or a lower alkyl group, which may be substituted, or an aryl radical, which may be substituted, or a cyano group, or $R^1$ and $R^2$ together with the nitrogen atom and an alkylene radical of 3 to 8 carbon atoms, preferably 4 to 6 carbon atoms, or together with a further hetero atom, such as a nitrogen atom or an oxygen atom, and two lower alkylene radicals form the radical of a 4- to 8-membered heterocyclic ring, such as, for example, an N-piperidino, N-piperazino or N-morpholino radical;

A is an aromatic carbocyclic or aromatic heterocyclic radical, preferably a substituted or unsubstituted phenylene or naphthylene radical, in particular a phenylene or naphthylene radical, both of which may be substituted by 1 to 3 substituents from the group comprising lower alkyl, such as methyl and ethyl, lower alkoxy, such as methoxy and ethoxy, halogen, such as chlorine and bromine, carboxy, nitro and sulfo, or is an alkylene radical having 1 to 8 carbon atoms, preferably 2 to 6 carbon atoms, or an alkylene radical of 2 to 8 carbon atoms, which may be interrupted by 1 or 2 hetero groups, such as —O— or —NH—;

X is a direct bond or a divalent organic linking member, such as, f or example, an alkylene radical of 1 to 6 carbon atoms, in particular an ethylene or propylene radical, or an alkyleneamino group of the formula

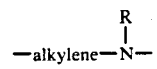

in which alkylene is an alkylene radical of 1 to 6 carbon atoms, preferably of 1 to 4 carbon atoms, and R has one of the abovementioned meanings, or is, for example, a radical of the formula (2a), (2b), (2c), (2d), (2e), (2f), (2h) or (2j), of these preferably a radical of the formula (2k), —(CH$_2$)$_k$— or

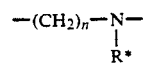

in which k is an integer from 1 to 5, n is an integer from 2 to 6, and

R* is a hydrogen atom or an alkyl group of 1 to 5 carbon atoms, such as ethyl and in particular methyl, or X together with the group —N(R)— forms a radical of the formula (3)

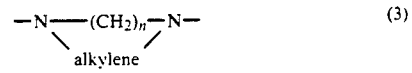

in which n has the abovementioned meaning and alkylene is an alkylene radical of 1 to 6 carbon atoms, preferably 1 to 4 carbon atoms;

Y, in the case where A is an aromatic radical, is a direct bond or a group of the formula —CO—NH—alkylene—, where alkylene has the above meaning,

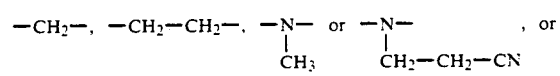

Y is an alkylene radical of 2 to 6 carbon atoms, preferably of 2 to 4 carbon atoms, such as the 1,2-ethylene or 1,3-propylene radical in which case the grouping —X—A— as a whole must be a direct bond and m is 2;

Z is a vinylsulfonyl group or an ethylsulfonyl group containing in the β position a substituent which can be eliminated by alkali, such as, for example, a β-chloroethylsulfonyl, β-acetoxyethylsulfonyl, β-thiosulfatoethylsulfonyl or β-phosphatoethylsulfonyl group, preferably a β-sulfatoethylsulfonyl group;

a is an integer from zero to 4, preferably zero, 1 or 2; in particular 1 or 2;

b is an integer from zero to 3;

c is an integer from zero to 3;

d is an integer from zero to 3;

e is an integer from zero to 2;

the sum of (a+b+c+d+e) is at most 4;

the sum of (a+b) is 1 to 4, preferably 1, 2 or 3;

the sum of (a+d) is 1 to 4;
the sum of (c+d) is zero to 4;
m is the number 1 or 2, preferably 1;
M is a hydrogen atom or an alkali metal, such as sodium, potassium or lithium, or another saltforming metal.

The formula members can have meanings which are identical to or different from one another.

The phthalocyanine dyes according to the invention are usually obtained in the form of mixtures of the individual compounds of the formula (1), these individual compounds differing from one another by the degree of substitution of the carboxy, sulfo, carboxamide and sulfonamide groups on the phthalocyanine radical, i.e. by the magnitude of the indices a, b, c, d and e. The formulae of the phthalocyanine dyes according to the invention therefore have indices which are usually fractional numbers.

A sulfo group is a group of the formula $-SO_3M$ where M has the abovementioned meaning; similarly, a carboxy group is a group of the formula $-COOM$, a sulfato group a group of the formula $-OSO_3M$, a thiosulfato group a group of the formula $-S-SO_3M$ and a phosphato group a group of the formula $-OPO_3M_2$, where M has in each case the abovementioned meaning.

The phthalocyanine dyes according to the invention of the formula (1) are present in the form of their salts, such as the alkali metal salts, and are used as such for the dyeing of fiber materials.

The term "lower" used above and below means that the groups designated by this term contain or are alkyl radicals or alkylene radicals of 1 to 6 carbon atoms, preferably of 1 to 4 carbon atoms. The aliphatic radicals and the aryl radicals of the formula members R, $R^1$ and $R^2$ can, as mentioned, contain substituents. In the alkyl radicals, preferably lower alkyl groups, the substituents are preferably hydroxy, lower alkoxy, chlorine, sulfato, cyano, sulfo, carboxy, phenyl, sulfophenyl and carboxyphenyl, these alkyl radicals, if substituted, preferably containing 1 or 2 of such substituents. Aryl radicals are preferably substituted or unsubstituted naphthyl radicals, such as sulfo-substituted naphthyl radicals, and in particular substituted phenyl radicals, preferably those having 1 or 2 substituents from the group comprising methyl, ethyl, methoxy, ethoxy, chlorine, carboxy and sulfo. Alkyl radicals are preferably a methyl or ethyl group, and alkoxy radicals are preferably an ethoxy and in particular a methoxy group.

Preferred compounds of the formula (1) are those in which e is the number zero or, if e is greater than zero, $R^1$ and $R^2$ are both a hydrogen atom. Furthermore, preference is given to those compounds in which Pc is a copper phthalocyanine radical, and furthermore those compounds of the formula (1) in which b, c and e are each zero.

Furthermore, preference is given to compounds of the formula (1) in which R is a hydrogen atom and furthermore to those in which A is a meta- or para-phenylene radical, which may be substituted by sulfo, methyl and/or methoxy, or is an ethylene or n-propylene radical; furthermore, preference is given to compounds in which X or Y or both are a direct bond.

Examples of radicals of the formula $-N(R)-X-A-(Y-Z)_m$ contained in the compounds of the formula (1) are 2-(β-sulfatoethylsulfonyl)phenylamino, 3-(β-sulfatoethylsulfonyl)phenylamino, 4-(β-sulfatoethylsulfonyl)phenylamino, 2-carboxy-5-(β-sulfatoethylsulfonyl)phenylamino, 2-chloro-3-(β-sulfatoethylsulfonyl)phenylamino, 2-chloro-4- (β-sulfatoethylsulfonyl)phenylamino, 2-ethoxy-4- or -5-(β-sulfatoethylsulfonyl)phenylamino, 2-ethyl-4-(β-sulfatoethylsulfonyl)phenylamino, 2-methoxy-5-(β-sulfato-ethylsulfonyl)phenylamino, 2,4-diethoxy-5-(β-sulfato-ethylsulfonyl)phenylamino, 2,4-dimethoxy-5-(β-sulfato-ethylsulfonyl)phenylamino, 2,5-dimethoxy-4-(β-sulfato-ethylsulfonyl)phenylamino 2-methoxy-5-methyl-4-(β-sulfatoethylsulfonyl)phenylamino, 2- or 3- or 4-(β-thiosulfatoethylsulfonyl)phenylamino, 2-methoxy-5-(β-thiosulfatoethylsulfonyl)phenylamino, 2-sulfo-4-(β-phosphatoethylsulfonyl)phenylamino, 2-sulfo-4-vinylsulfonylphenylamino, 2-hydroxy-4- or -5-(β-sulfatoethylsulfonyl)phenylamino, 2-chloro-4- or -5-(β-chloroethylsulfonyl)phenylamino, 2-hydroxy-3-sulfo-5-(β-sulfatoethylsulfonyl)phenylamino, 3- or 4-(β-acetoxyethylsulfonyl)phenylamino, 2-methoxy-4-[β-(N-methyltauryl)ethylsulfonyl]phenylamino, 5-(β-sulfatoethylsulfonyl)naphth2-ylamino, 6- or 7- or 8-(β-sulfatoethylsulfonyl)naphth2-ylamino, 6-(β-sulfatoethylsulfonyl)-1-sulfonaphth-2-ylamino, 5-(β-sulfatoethylsulfonyl)-1-sulfonaphth-2-ylamino, 8-(β-sulfatoethylsulfonyl)-6-sulfonaphth-2-ylamino, β-[4-(β'-sulfatoethylsulfonyl)phen]ethylamino, β-[2-sulfo-4-(β'-sulfatoethylsulfonyl)phen]ethylamino, (β'-chloroethylsulfonyl)ethylamino, β-(β'-sulfatoethylsulfonyl)ethylamino, β-(vinylsulfonyl)ethylamino, γ-(β'-chloroethylsulfonyl)propylamino, γ-(β'-sulfatoethylsulfonyl)propylamino, γ-(β'-bromoethylsulfonyl)propylamino, γ-(vinylsulfonyl)propylamino, 1-methyl-1-(β-sulfatoethylsulfonyl)-1-ethylamino, δ-(β'-sulfatoethylsulfonyl)butylamino, 2-methyl-2-(β-chloroethylsulfonyl)-1-propylamino, ω-(β'-chloroethylsulfonyl)pentylamino, β-(β'-chloroethylsulfonyl)-n-hexylamino, N-methyl-N-[β-(β'-chloroethylsulfonyl)ethyl]amino, N-ethyl-N-[β-(β'-chloroethylsulfonyl)ethyl]amino, N-n-propyl-N-[β-(β'-chloroethylsulfonyl)ethyl]amino, N-n-butyl-N-[62-(β'-chloroethylsulfonyl)ethyl]amino, N-n-pentyl-N-[β-(β'-chloroethylsulfonyl)ethyl]amino, N-n-hexyl-N-[β-(β'-chloroethylsulfonyl)ethyl]amino, N-carboxymethyl-N-[β-(β'-bromoethylsulfonyl)ethyl]amino, N-sulfatomethyl-N-[β-(β'-chloroethylsulfonyl)ethyl]amino, N-(β-carboxyethyl)-N-[γ'-chloroethylsulfonyl)propyl]amino, N-(β-sulfatoethyl)-N-[γ'-(β''-chloroethylsulfonyl)propyl]amino, N-(β-sulfatoethyl)-N-[δ'-(β''-chloroethylsulfonyl)butyl] amino, N-(β-ethoxyethyl)-N-[δ'-(β''-chloroethylsulfonyl)butyl)amino, N-(δ-chloropropyl)-N-[β'-(β''-chloroethylsulfonyl)ethyl]amino, N-phenyl-N-[β-(β'-chloroethylsulfonyl)ethyl]amino, N-(4-chlorophenyl)-N-[β-(β'-chloroethylsulfonyl)ethyl)amino, N-(2-methylphenyl)-N-[β-(β'-chloroethylsulfonyl)ethyl]amino, N-(4-methoxyphenyl)-N-[β-(β'-chloroethylsulfonyl)ethyl]amino, N-(3-sulfophenyl)-N-[-62 -(β'-chloroethylsulfonyl)ethyl]amino, N-(4-sulfophenyl)-N-[β-(β'-chloroethylsulfonyl)ethyl]amino, bis[β-(β'-chloroethylsulfonyl)ethyl]amino, bis[β-(β'-bromoethylsulfonyl)ethyl]amino, bis[γ-(β'-chloroethylsulfonyl)propyl]amino, bis[γ-(β'-chloroethylsulfonyl)butyl]amino, bis(β-vinylsulfonylethyl)amino, N-(β-cyanoethyl)-N-[γ'-(β'-chloroethylsulfonyl)propyl]amino, β-[β'-(β''-chloroethylsulfonyl)ethylamino]ethylamino, β-[β'-(β''-sulfatoethylsulfonyl)ethylamino]ethylamino, β-[β'-(β''-chloroethylsulfonyl)ethoxy]ethylamino, β-[β'-(β''-sulfatoethylsulfonyl)ethoxy]ethylamino, 4-[β-(β'-chloroethylsulfonyl)ethyl]piperazin-1-yl, 4-[γ-(β'-chloroethylsulfonyl)propyl]piperazin-1-yl, 4-[β-(β'-sulfatoethylsulfonyl)ethyl]piperazin-1-yl, 4-[γ-(β'- sulfatoethylsulfonyl)propyl)piperazin-1-yl, 3,4-di-(β-sulfatoethylsulfonyl)- phenylamino, 2,5-di-(β-sulfatoethylsulfonyl)-phenylamino, 4-[γ-(β'-sulfatoethylsulfonyl)propoxy]-phenylamino, 2,5-bis[(β-sulfatoethylsulfonyl)methyl]-phenylamino, 3- or 4-{N -[γ-(β'-sulfatoethylsulfonyl)-propylamidocarbonyl]}phenylamino and 3,5-bis-{N-[γ-(β'-sulfatoethylsulfonyl)propylamidocarbonyl]} phenylamino.

Examples of radicals of the formula —NR¹R², which may be present in the compounds of the formula (1), are methylamino, ethylamino, n-butylamino, benzylamino, phenylamino, β-hydroxyethylamino, dimethylamino, diethylamino, di(isopropyl)amino, N-methylbenzylamino, N-methylphenylamino, N-piperidino, N-morpholino, di(fl-hydroxyethyl)amino, β-sulfoethylamino, β-carboxyethylamino, β-(4-carboxyphenyl)ethylamino, 3-sulfophenylamino, 4-sulfophenylamino, a primary amino group and a cyanamido radical.

The present invention furthermore relates to a process for the preparation of the phthalocyanine compounds of the formula (1), which comprises reacting a phthalocyanine acid chloride of the formula (4)

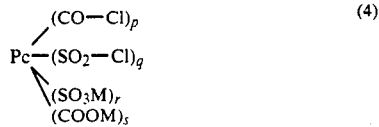

in which
Pc and M have the abovementioned meanings,
p is an integer from 1 to 4,
q is an integer from zero to 3,
r is an integer from zero to 3 and
s is an integer from zero to 3,
the sum of (p+q+r+s) being an integer from 1 to 4,
the sum of (p+q) being a number from 1 to 4 and
the sum of (r+s) being a number from zero to 3,
or a mixture of these compounds of the formula (4) in an aqueous or aqueous-organic medium simultaneously or in any desired order with an amine of the formula (5)

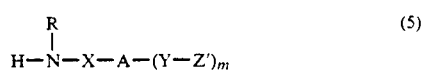

in which R, X, A, Y and m have the abovementioned meanings and Z' has one of the meanings mentioned for Z or is a β-hydroxyethylsulfonyl group and, if desired, with a further amine of the formula (6)

in which R¹ and R² have the abovementioned meanings, and, if Z' is a β-hydroxyethylsulfonyl group, converting the resulting β-hydroxyethylsulfonyl-containing phthalocyanine compound in a manner known per se into a phthalocyanine dye of the formula (1) containing a radical Z.

During the condensation reactions of the phthalocyanine acid chlorides of the formula (4) with an amino compound of the formula (5) or the amines of the formulae (5) and (6), partial hydrolysis of the carbonyl chloride groups and any sulfonyl chloride groups present may take place at the same time. As a rule, partial hydrolysis of these acid chloride groups to give carboxy or sulfo groups is unavoidable.

If, in the process according to the invention for the preparation of the phthalocyanine compounds of the formula (1), the reaction is started with a starting amine of the formula (5) in which Z' is a β-hydroxyethylsulfonyl group, the phthalocyanine compound obtained, which has the formula (1) but in which Z in this case is a β-hydroxyethylsulfonyl group, is converted into a phthalocyanine compound according to the invention containing an ester group, such as, for example, a sulfato group, in the β position of the ethylsulfonyl radical. This esterification reaction is carried out analogously to known procedures using esterification and acylating agents which are customary for such acids, such as, for example, acetic anhydride, polyphosphoric acid, phosphorus pentachloride and in particular 96–100% sulfuric acid or sulfuric acid containing sulfur trioxide, such as oleum having a sulfur trioxide content of up to 35%, or chlorosulfonic acid, in order to introduce the sulfato group. The reaction using sulfuric acid or sulfuric acid containing sulfur trioxide is carried out at a temperature of between 0° C. and 25° C. The reaction using chlorosulfonic acid can also take place in a polar organic solvent, such as, for example, N-methylpyrrolidone, at 10° to 80° C.

Phthalocyanine dyes of the formula (1) can be converted in a customary and known manner into phthalocyanine dyes of the formula (1) containing, in the fiber-reactive radical Z, a different substituent which can be eliminated by alkali. Numerous procedures of this type have been described in the literature on fiber-reactive dyes containing a fiber-reactive radical from the vinylsulfonyl series. Thus, phthalocyanine dyes containing a β-sulfatoethylsulfonyl radical can be converted into phthalocyanine dyes containing a vinylsulfonyl group as the radical Z by treatment with alkali, for example in aqueous sodium hydroxide solution, at a temperature of 0° to 40° C. for a few minutes. Phthalocyanine dyes according to the invention with a β-thiosulfatoethylsulfonyl radical can be obtained, for example, from phthalocyanine dyes containing a vinylsulfonyl group by reaction with sodium thiosulfate.

The condensation reactions according to the invention between the compounds of the formula (4) and the amines of the formulae (5) and (6) are carried out in the presence of a catalyst, such as pyridine, a pyridinesulfonic acid, pyridine carboxylic acid, pyridinesulfonamide or pyridinecarboxamide compound analogously to the procedures disclosed in the U.S. patents mentioned at the beginning. The condensation reactions according to the invention are carried out at a pH of between 3.5 and 8.5, preferably 4 and 8, in particular 5.5 and 6.5, and at a temperature of between 0° C. and 100° C., preferably 5° and 40° C., in particular 20° and 30° C.

Examples of pyridinesulfonic acid, -carboxylic acid, -sulfonamide and -carboxamide compounds which catalyze the condensation reaction according to the invention are pyridine-3-carboxylic acid, pyridine-2-carboxylic acid, pyridine-2-sulfonic acid, pyridine-3-sulfonic acid, pyridine-4-sulfonic acid, pyridine-4-carboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine-3,5-dicarboxylic acid, pyridine-2,3,4-tricarboxylic acid, pyridine-2,4,5-tricarboxylic acid, 2-methylpyridine-3-sulfonic acid, 4-methylpyridine-3-carboxylic acid, 4-ethylpyridine-3-carboxylic acid, 6-methylpyridine-3-carboxylic acid, 4,6-dimethylpyridine-2-carboxylic acid, 2,6-dimethylpyridine-3-carboxylic acid, 2-methylpyridine-3,4-dicarboxylic acid, pyridine-2-sulfonamide, pyridine-3-sulfonamide, pyridine-4-sulfonamide, pyridine-2,3-dicarboxamide, pyridine-2,4-dicarboxamide, pyridine-2,5-dicarboxamide, pyridine-2,6-dicarboxamide, pyridine-3,4-dicarboxamide, pyridine-3,5-dicarboxamide, pyridine-2,3,4-tricarboxamide, pyridine-2,4,5-tricarboxamide, 2-methylpyridine-3-sulfonamide, 4-methylpyridine-3-carboxamide, 4-ethylpyridine-3-carboxamide, 6-methylpyridine-3-carboxamide, 4,6-dimethylpyridine-2-carboxamide, 2,6-dimethylpyridine-3-carboxamide, 2-methylpyridine-3,4-dicarboxamide, pyridine-4-carboxamide, pyridine-3-carboxamide and pyridine-2-carboxamide, of these preferably pyridine-3-carboxamide and pyridine-3-carboxylic acid.

Phthalocyaninesulfonyl chlorides and phthalocyaninecarbonyl chlorides have been known in the literature for a long time. The preparation of the phthalocyaninesulfonyl chlorides is apparent, for example, from the details given in the U.S. patents mentioned at the beginning and from German Patent No. 891,121. Phthalocyaninecarbonyl chlorides can be prepared by the procedure given in U.S. Pat. No. 3,301,814, in which one or more of the starting compounds is/are substituted by carboxy groups. Conversion of the carboxy-substituted phthalocyanines thus obtained into their carbonyl chloride compounds takes place by the well-known methods of converting carboxyl groups into carbonyl chloride groups. Phthalocyanine compounds containing both carbonyl chloride and sulfonyl chloride groups can be obtained by sulfochlorination of the phthalocyaninecarbonyl acid or -carbonyl chloride compounds.

Examples of phthalocyanine starting compounds of the formula (4) are the carbonyl chlorides and the carboxycontaining carbonyl chlorides of the metal-free phthalocyanine and preferably of the copper phthalocyanine, cobalt phthalocyanine and nickel phthalocyanine, such as, for example, the mono-, di-, tri- and tetracarbonyl chloride of copper phthalocyanine, cobalt phthalocyanine and nickel phthalocyanine, for example copper phthalocyanine-3-monocarbonyl chloride, copper phthalocyanine-3-dicarbonyl chloride, copper phthalocyanine-3-tricarbonyl chloride, copper phthalocyanine-3-tetracarbonyl chloride, nickel phthalocyanine-3-tetracarbonyl chloride, cobalt phthalocyanine-3-monocarbonyl chloride, cobalt phthalocyanine-3-di- and -tricarbonyl chloride, copper phthalocyanine-4-mono- and -dicarbonyl chloride, copper phthalocyanine-4-tri- and -tetracarbonyl chloride, copper phthalocyanine-3-monocarbonyl chloride/-disulfonyl chloride, copper phthalocyanine-3-dicarbonyl chloride/monosulfonyl chloride, copper phthalocyanine-3-monocarbonyl chloride/ monocarboxylic acid, copper phthalocyanine-3-dicarbonyl chloride/monocarboxylic acid and copper phthalocyanine-3-dicarbonyl chloride/disulfonyl chloride and furthermore the acid chlorides of this type additionally containing other substituents on the phthalocyanine ring, such as phenyl radicals and halogen atoms, such as, for example, the carbonyl chlorides or mixed carbonyl/sulfonyl chlorides of copper tetraphenylphthalocyanine or nickel tetrachlorophthalocyanine.

Examples of acid-binding agents used in the process according to the invention for the preparation of the compounds of the formula (1) are the hydroxides, carbonates, bicarbonates, secondary phosphates, tertiary phosphates, borates and acetates of the metals from group I to III of the periodic table, preferably of the alkali metals, such as sodium, potassium and lithium, and of the alkaline earth metals, such as calcium.

The process according to the invention for the preparation of the compounds (1) is preferably carried out in an aqueous medium. In order to improve the solubility of the starting or end products in the aqueous reaction medium, an organic solvent, preferably an amide of an aliphatic carboxylic acid, such as dimethylformamide or N-methylpyrrolidone may be added, if appropiate.

The phthalocyanine dyes of the formula (1) prepared according to the invention, hereinafter called "dyes (1)", are separated from the synthesis batches by generally known methods, either by precipitation from the reaction medium by means of electrolytes, such as, for example, sodium chloride or potassium chloride, or by evaporation of the reaction solution, for example by spray-drying, in which case a buffer substance can be added to this reaction solution. They have fiber-reactive properties and have very good dye properties. Accordingly, they can be used for the dyeing and printing of hydroxy- and/or carboxamido-containing material, in particular fiber material, and also of leather. Likewise, the solutions produced upon synthesis of the compounds according to the invention can be used, if appropriate after addition of a buffer substance and, if necessary, after concentration, directly as liquid preparation for dyeing.

Accordingly, the present invention also relates to the use of the dyes (1) for the dyeing (including printing) of hydroxy- and carboxamido-containing materials and to processes for their application to these substrates. The materials are preferably used in the form of fiber materials, in particular in the form of textile fibers, such as yarns, wound packages and fabrics.

Hydroxy-containing materials are natural or synthetic hydroxy-containing materials, such as, for example, cellulose fiber materials, including those in the form of paper, or regenerated products thereof and polyvinyl alcohols. Cellulose fiber materials are preferably cotton but also other vegetable fibers; such as linen, hemp, jute and ramie fibers; examples of regenerated cellulose fibers are staple viscose and filament viscose.

Examples of carboxamido-containing materials are synthetic and natural polyamides and polyurethanes, in particular in the form of fibers, for example wool and other animal hair, silk, leather, nylon 6.6, nylon 6, nylon 11 and nylon 4.

The dyes (1) can be applied to the substrates mentioned, in particular to the fiber materials mentioned, by the application methods known for water-soluble dyes, in particular for fiber-reactive dyes and fixed. Thus, on cellulose fibers, they produce dyeings having excellent color build-up in very good color yield by the exhaust method from a long liquor using a wide range of acid-binding agents and, if desired, neutral salts, such as sodium chloride or sodium sulfate. Dyeing is carried out at temperatures of between 40° and 105° C., if appropriate at temperatures of up to 130° C. under pressure, and, if appropriate, in the presence of customary dyeing assistants, in an aqueous bath. The procedure can be such that the material is introduced into the hot bath, this bath is gradually heated to the desired dyeing temperature, and the dyeing process is completed at this temperature. The neutral salts, which accelerate the exhaustion of the dye, can, if desired, also be added to the bath only after reaching the actual dyeing temperature.

Dyeings on cellulose fibers having excellent color yields and very good color build-up are also obtained by the padding process, in which the dye can be fixed in the usual manner by steaming or by means of dry heat, while allowing the material to be dyed to remain at room temperature or elevated temperature, for example up to about 60° C.

The customary printing processes for cellulose fibers, which may be carried out either in a single phase, for example by printing using a printing plate containing sodium bicarbonate or another acid-binding agent and the colorant, followed by steaming at 100° to 103° C., or in two phases, for example by printing using a neutral or weakly acidic printing paste containing the colorant, followed by fixing, either by leading the printed goods through a hot electrolyte-containing alkaline bath or by overpadding using an alkaline electrolyte-containing padding liquor and then by letting this treated material stand or by steaming it or by treating it with dry heat, likewise produce prints of high color strength, crisp outlines and a clear white ground. Varying fixation conditions have only a slight effect on how the prints turn out. Not only in dyeing but also in printing, the degrees of fixation obtained using the compounds according to the invention are very high.

Hot air at 120° to 200° C. is used for fixing by means of dry heat using the customary dry heat setting processes. Apart from customary steam at 101° to 103° C., superheated steam and pressurized steam having temperatures of up to 160° C. can also be used.

Examples of acid-binding agents and agents effecting fixation of the dyes on the cellulose fibers are watersoluble basic alkali metal salts and alkaline earth metal salts of inorganic or organic acids, and also compounds which release alkali in the heat. In particular, alkali metal hydroxides and alkali metal salts of weakly to medium-strong inorganic or organic acids may be mentioned, alkali metal compounds being understood to mean preferably sodium compounds and potassium compounds. Examples of such acid-binding agents are sodium hydroxide, potassium hydroxide, sodium carbonate, sodium bicarbonate, potassium carbonate, sodium formate, sodium dihydrogen phosphate and disodium hydrogen phosphate.

The treatment of the dyes (1) with the acid-binding agents, if appropriate with the application of heat, binds the dyes chemically to the cellulose fiber; after the customary aftertreatment, which consists in rinsing for removing non-fixed dye portions, in particular the cellulose dyeings have excellent wetfastness properties, especially since non-fixed dye portions can be easily washed off because of their good water solubility in the cold.

The dyeings on the polyurethane and polyamide fibers are usually carried out from an acid medium. Thus, for example, acetic acid and/or ammonium sulfate and/or acetic acid and ammonium acetate or sodium acetate can be added to the dye bath in order to obtain the desired pH. In order to obtain a reasonable levelness of the dyeing, it is recommended to add customary leveling agents, such as, for example, those based on a reaction product of cyanuric chloride with three times the molar amount of an aminobenzenesulfonic acid or aminonaphthalenesulfonic acid or based on a reaction product of, for example, stearylamine with ethylene oxide. As a rule, the material to be dyed is introduced into the bath at a temperature of about 40° C., the material is agitated therein for some time, the dye bath is then readjusted to the desired weakly acidic, preferably weakly acetic acid, pH, and the actual dyeing is carried out at a temperature of between 60° and 98° C. However, it is also possible to carry out the dyeings at the boiling temperature or at temperatures of up to 120° C. (under pressure).

The dyeings and prints on cellulose fiber materials produced using the compounds (1) according to the invention have high color strength, furthermore good lightfastness properties and good wetfastness properties, such as wash, milling, water, seawater, cross-dyeing and perspiration fastness properties, moreover good pleating fastness, hot-press fastness and rub fastness. Their alkaline perspiration lightfastness and the good wet lightfastness of the dyeings wetted with drinking water may be mentioned in particular.

The Examples which follow serve to illustrate the invention. The compounds described by way of their formulae are given in the form of the free acid; in general, they are prepared and isolated in the form of their alkali metal salts and used for dyeing in the form of their salts. Likewise, the starting compounds mentioned in the form of the free acid in the Examples which follow, in particular the Table Examples, may be used in the synthesis as such or in the form of their salts, preferably their alkali metal salts, such as sodium salts or potassium salts.

The parts and percentages given in the Examples are by weight, unless stated otherwise. Parts by weight relate to parts by volume as the kilogram relates to the liter. The formula radical CuPc is a copper phthalocyanine radical, and the formula radical NiPc is a nickel phthalocyanine radical.

The absorption maxima ($\lambda_{max}$) in the visible range listed for the compounds according to the invention were determined using their alkali metal salts in aqueous solution. In the Table Examples, the $\lambda_{max}$ values are put in brackets next to the hue given; the wavelength is given in nm.

EXAMPLE A 299 parts of phthalic anhydride are milled together with 131 parts of benzenetricarboxylic anhydride, 78 parts of ammonium chloride, 952 parts of urea, 12 parts of ammonium molybdate and 200 parts of copper sulfate. The mixture is introduced into 800 parts of nitrobenzene, and the reaction is carried out at a temperature of between 160° and 190° C. for several hours. After the reaction is complete, the precipitated product is filtered off, washed with ethanol, then introduced into a 20% aqueous sodium hydroxide solution, stirred therein and filtered off again with suction, washed with a small amount of water and dried. To recrystallize the copper phthalocyanine monocarboxylic acid obtained, it is dissolved in conc. sulfuric acid, the solution is slowly stirred into ice, and the precipitated copper phthalocyanine monocarboxylic acid is filtered off.

EXAMPLE B 63.8 parts of copper phthalocyanine monocarboxylic acid are introduced into 100 parts of chlorosulfonic acid, and the two reactants are reacted with one another at a temperature of between 120° and 130° C. for about four hours. 44 parts of thionyl chloride are then added, and the reaction is carried out at 60° to 90° C. for about four hours. The reaction batch is then poured onto ice, and the residue is filtered off, giving a chlorosulfonyl-containing copper phthalocyanine monocarbonyl chloride having on average 2.1 chlorosulfonyl groups in the molecule.

EXAMPLE C 78 parts of copper phthalocyanine monocarboxylic acid are added to 200 parts of chlorosulfonic acid, and the batch is heated at a temperature of between 140° and 150° C. for about four hours. 100 parts of thionyl chloride are then added, and the reaction is carried out at 70° to 90° C. for about four hours. After the reaction is complete, the batch is poured onto ice, and the residue is filtered off, giving a chlorosulfonyl-containing copper phthalocyanine monocarbonyl chloride having on average two chlorosulfonyl groups in the molecule.

EXAMPLE D 350 parts of copper phthalocyanine monocarboxylic acid are introduced into 1000 parts of chlorosulfonic acid, the batch is heated at a temperature of between 153° and 156° C. for about four hours, 430 parts of thionyl chloride are then added, the batch is maintained at 60° to 90° C. for about four hours, and, after this reaction is complete, the reaction solution obtained is poured onto ice, and the residue is filtered off, giving a chlorosulfonylcontaining copper phthalocyanine monocarbonyl chloride containing on average 2.5 chlorosulfonyl groups in the molecule.

EXAMPLE E

To prepare the nickel phthalocyanine monocarboxylic acid, 299 parts of phthalic anhydride are milled with 131 parts of benzenetricarboxylic anhydride, 78 parts of ammonium chloride, 952 parts of urea, 12 parts of ammonium molybdate and 180 parts of nickel sulfate. The mixture is introduced into 800 parts of nitrobenzene, and the reaction is carried out at a temperature of between 160° and 190° C. for several hours. After the reaction is complete, the precipitated product is filtered off, washed with ethanol, then introduced into a 20% aqueous sodium hydroxide solution, stirred therein and filtered off again with suction, washed with a small amount of water and dried. To recrystallize the nickel phthalocyanine monocarboxylic acid obtained, it is dissolved in conc. sulfuric acid, the solution is slowly stirred into ice, and the precipitated nickel phthalocyanine monocarboxylic acid is filtered off.

EXAMPLE F 350 parts of nickel phthalocyanine monocarboxylic acid are introduced into 1000 parts of chlorosulfonic acid, the batch is heated at a temperature of between 153° and 156° C. for about four hours, 430 parts of thionyl chloride are then added, the batch is maintained at 60° to 90° C. for about four hours, and, after this reaction is complete, the reaction solution obtained is poured onto ice, and the residue is filtered off, giving a chlorobulfonylcontaining nickel phthalocyanine monocarbonyl chloride containing on average 2.5 chlorosulfonyl groups in the molecule.

EXAMPLE 1

23.2 parts of the chlorosulfonyl-containing copper phthalocyanine monocarbonyl chloride from Example C (the copper phthalocyanine compound is used in the form of a moist filtercake) are added to a solution of 42.1 parts of 4-($\beta$-sulfatoethylsulfonyl)aniline in 100 parts of water having a pH of 6.5 with thorough stirring. 5.9 parts of nicotinamide are then added. The reaction slowly begins and it is maintained at a temperature of 20° to 25° C. and a pH of 6 to 6.5 for about seven hours.

The copper phthalocyanine dye according to the invention, whose composition, written in the form of the free acid, is that of formula (10) (for the formula, see formula sheets following the last Example) is isolated from the clear blue-green solution obtained in the usual manner by salting out with sodium chloride or by evaporation or spray drying. The dye according to the invention has an absorption maximum in the visible range at 660 nm and has very good fiber-reactive dye properties. It dyes the materials mentioned in the description, such as, in particular, cellulose fiber materials, by the dyeing and printing processes customary for fiber-reactive dyes in green to greenish-blue hues having very good fastness properties.

EXAMPLE 2

23.2 parts of the chlorosulfonyl-containing copper phthalocyanine monocarbonyl chloride compound from Example C (the copper phthalocyanine compound is introduced in the form of a moist filtercake) are added to a solution of 42.1 parts of 3-($\beta$-sulfatoethylsulfonyl)aniline in 100 parts of water having a pH of 6.5 with thorough stirring. 5.9 parts of nicotinamide are then added. The reaction starts slowly and it is maintained at a temperature of 20° to 25° C. and a pH of between 6 and 6.5 for about 7 hours.

The phthalocyanine dye according to the invention is isolated from the clear, blue-green solution by salting out with sodium chloride or by spray-drying. Its chemical composition, written in the form of the free acid, is that of formula (11) (for the formula, see formula sheets following the last Example). It has an absorption maximum in the visible range at 660 nm and has very good fiber-reactive dye properties. It produces, for example on cotton, green to greenish-blue dyeings having high color strength and good fastness properties using the application processes customary in industry.

EXAMPLE 3

23.2 parts of the chlorosulfonyl-containing copper phthalocyanine monocarbonyl chloride compound from Example D is introduced into a solution of 43 parts of 4-($\beta$-sulfatoethylsulfonyl)aniline in 100 parts of water having a pH of 6.5 in the form of a moist filtercake with thorough stirring. 5.9 parts of nicotinamide are added, and the reaction is carried out at 20° to 25° C. and a pH of 6 to 6.5 for about seven hours.

The phthalocyanine dye formed, whose chemical constitution can be represented by the formula (12) (for the formula, see formula sheets following the last Example), written in the form of the free acid, is isolated from the clear blue-green solution in the usual manner. It has an absorption maximum in the visible range at 660 nm and produces, by the application and fixation processes customary in industry for fiber-reactive dyes, green dyeings having high color strength and good fastness properties on, for example, cotton.

EXAMPLE 4

To prepare a copper phthalocyanine dye according to the invention, the procedure of Example 3 is repeated, except that the starting material is a solution of 43 parts of 3-($\beta$-sulfatoethylsulfonyl)aniline in 150 parts of water having a pH of 6.5, giving a copper phthalocyanine dye according to the invention, whose chemical constitution is that of the formula (13), written in the form of the free acid. It has an absorption maximum in the visible range at 660 mn. It produces, by the dyeing methods for fiber-reactive dyes, green dyeings having high color strength and good fastness properties on the materials mentioned in the description, such as, in particular, cellulose fiber materials.

EXAMPLES 5 TO 22

In the Table Examples which follow, further phthalocyanine dyes according to the invention of the formula (A) (for the formula, see formula sheets following the last Example) are described by means of the formula components. They can be prepared according to the invention, for example using one of the above Working Examples, by means of their components apparent from the particular Table Example in combination with the formula (A) (for example a sulfonyl-containing and, if desired, sulfocontaining copper phthalocyanine mono- or dicarbonyl chloride and an amino compound of the formula (5) given in the description). They have fiber-reactive dye properties and produce, by the application and fixation methods customary for fiber-reactive dyes, dyeings and prints of high color strength and good fastness properties, in particular on cellulose fiber materials, in the hue indicated in the particular Table Example for dyeings on cotton.

| Ex. | Radical R$^4$ | Index A | Index B | Hue |
| --- | --- | --- | --- | --- |
| 5 | 2,5-di($\beta$-sulfatoethylsulfonyl)-phenylamino | 1.2 | 2.3 | green (660) |
| 6 | 2-($\beta$-sulfatoethylsulfonyl)-ethylamino | 2.0 | 1.5 | green (663) |
| 7 | 2-($\beta$-chloroethylsulfonyl)-ethylamino | 2.0 | 1.5 | green (663) |
| 8 | 2-($\beta$-sulfatoethylsulfonyl)-phenylamino | 1.1 | 2.4 | green (661) |
| 9 | 2-methoxy-5-($\beta$-sulfatoethylsulfonyl)phenylamino | 1.3 | 2.2 | green (664) |
| 10 | 2-methoxy-4-($\beta$-sulfatoethylsulfonyl)phenylamino | 1.3 | 2.2 | green (664) |
| 11 | N-ethyl-4-($\beta$-sulfatoethylsulfonyl)phenylamino | 1.0 | 2.5 | green (665) |
| 12 | N-ethyl-3-($\beta$-sulfatoethylsulfonyl)phenylamino | 1.1 | 2.4 | green (665) |
| 13 | 2-sulfo-5-($\beta$-sulfatoethylsulfonyl)phenylamino | 1.4 | 2.1 | green (659) |
| 14 | 2-carboxy-5-($\beta$-sulfatoethylsulfonyl)phenylamino | 1.3 | 2.2 | green (659) |
| 15 | 2-hydroxy-5-($\beta$-sulfatoethylsulfonyl)phenylamino | 1.7 | 1.8 | green (661) |
| 16 | 2-hydroxy-4-($\beta$-sulfatoethylsulfonyl)phenylamino | 1.8 | 1.7 | green (661) |
| 17 | 3-($\beta$-sulfatoethylsulfonyl)-propylamino | 2.0 | 1.5 | green (663) |
| 18 | 3-($\beta$-chloroethylsulfonyl)-propylamino | 2.1 | 1.4 | green (663) |
| 19 | $\beta$-[4-($\beta'$-sulfatoethylsulfonyl)phenyl]ethylamino | 2.0 | 1.5 | green (662) |
| 20 | $\beta$-[2-sulfo-5-($\beta'$-sulfatoethylsulfonyl)phenyl]ethylamino | 2.0 | 1.5 | green (662) |
| 21 | N,N-bis-[$\beta$-($\beta'$-chloroethylsulfonyl)ethyl]amino | 1.9 | 1.6 | green (662) |
| 22 | 3,4-di($\beta$-sulfatoethylsulfonyl)-penylamino | 1.2 | 2.3 | green (660) |

EXAMPLE 23

23.2 parts of the chlorosulfonyl-containing copper phthalocyanine monocarbonyl chloride compound from Example D is introduced in the form of a moist filtercake into a mixture of 100 parts of water and 7 parts of a 25% aqueous ammonia solution at 20° C. and then an aqueous solution of 43 parts of 4-($\beta$-sulfatoethylsulfonyl)aniline in 100 parts of water and 5.9 parts of nicotinamide with thorough stirring. The starting reaction is maintained at a temperature of 20° to 25° C. and a pH of 6 to 6.5 for about seven hours. The phthalocyanine compound according to the invention is isolated from the clear blue-green solution obtained in the usual manner by evaporation under reduced pressure or by salting out with sodium chloride. This gives an electrolyte-containing (predominantly sodium chloride-containing) green-blue powder containing the alkali metal salt (sodium salt) of the compound of the formula (14) (for the formula, see formula sheets following the last Example). The copper phthalocyanine dye according to the invention has very good properties in practical application and dyes, by the application and fixation processes customary in industry for fiber-reactive dyes, the materials mentioned in the description, in particular cellulose fiber materials, in green to greenish-blue hues having high color strength and good fastness properties. It has an absorption maximum in the visible range at 660 nm.

EXAMPLE 24

To prepare a copper phthalocyanine dye according to the invention, the procedure of Example 23 is repeated, except that instead of the neutral solution of 4-($\beta$-sulfatoethylsulfonyl)aniline the aqueous solution containing the same amount of 3-($\beta$-sulfatoethylsulfonyl)aniline is used and moreover the reaction is carried out at a pH of 6.5 and a temperature of 20° to 25° C. The copper phthalocyanine dye obtained, whose composition is that of the formula (15) (for the formula, see formula sheets following the last Example), written in the form of the free acid, likewise shows very good fiber-reactive dye properties and dyes, for example, cotton in green to greenish-blue hues of high color strength and good fastness properties. It shows an absorption maximum in the visible range at 660 nm.

EXAMPLES 25 TO 42

In the Table Examples which follow, further phthalocyanine dyes according to the invention of the formula (B) (for the formula, see formula sheets following the last Example) are described by means of the formula components. They can be prepared according to the invention, for example using one of the above Working Examples, by means of their components apparent from the particular Table Example in combination with the formula (B) (for example a sulfonyl-containing and, if desired, sulfocontaining copper phthalocyanine mono- or dicarbonyl chloride, an amino compound of the formula (5) given in the description and ammonia). They have fiber-reactive dye properties and produce, by the application and fixation methods customary for fiber-reactive dyes, dyeings and prints of high color strength and good fastness properties, in particular on cellulose fiber materials, in the hue indicated in the particular Table Example for dyeings on cotton.

| Ex. | Radical R$^4$ | Index A | Index B | Hue |
| --- | --- | --- | --- | --- |
| 25 | 2,5-di($\beta$-sulfatoethylsulfonyl)-phenylamino | 1.1 | 1.4 | green (660) |

-continued

| Ex. | Radical R⁴ | Index A | Index B | Hue |
|---|---|---|---|---|
| 26 | 2-(β-sulfatoethylsulfonyl)-ethylamino | 2.5 | 0.5 | green (663) |
| 27 | 2-(β-chloroethylsulfonyl)-ethylamino | 2.0 | 0.5 | green (663) |
| 28 | 2-(β-sulfatoethylsulfonyl)-phenylamino | 1.0 | 1.5 | green (663) |
| 29 | 2-methoxy-5-(β-sulfatoethylsulfonyl)phenylamino | 1.1 | 1.4 | green (664) |
| 30 | 2-methoxy-4-(β-sulfatoethylsulfonyl)phenylamino | 1.2 | 1.3 | green (664) |
| 31 | N-ethyl-4-(β-sulfatoethylsulfonyl)phenylamino | 1.0 | 1.5 | green (660) |
| 32 | N-ethyl-3-(β-sulfatoethylsulfonyl)phenylamino | 1.0 | 1.5 | green (660) |
| 33 | 2-sulfo-5-(β-sulfatoethylsulfonyl)phenylamino | 1.3 | 1.2 | green (660) |
| 34 | 2-carboxy-5-(β-sulfatoethylsulfonyl)phenylamino | 1.3 | 2.2 | green (659) |
| 35 | 2-hydroxy-5-(β-sulfatoethylsulfonyl)phenylamino | 1.5 | 1.0 | green (661) |
| 36 | 2-hydroxy-4-(β-sulfatoethylsulfonyl)phenylamino | 1.5 | 1.0 | green (661) |
| 37 | 3-(β-sulfatoethylsulfonyl)-propylamino | 1.8 | 1.7 | green (664) |
| 38 | 3-(β-chlorethylsulfonyl)-propylamino | 1.8 | 1.7 | green (664) |
| 39 | β-[4-(β'-sulfatoethylsulfonyl)phenyl]ethylamino | 2.0 | 0.5 | green (662) |
| 40 | β-[2-sulfo-5-(β'-sulfatosulfonyl)phenyl]ethylamino | 2.0 | 0.5 | green (662) |
| 41 | N,N-bis-[β-(β'-chloroethylsulfonyl)ethyl]amino | 2.0 | 0.5 | green (662) |
| 42 | 3,4-di(β-sulfatoethylsulfonyl)penylamino | 1.2 | 1.3 | green (661) |

EXAMPLE 43

23.2 parts of the chlorosulfonyl-containing copper phthalocyanine monocarbonyl chloride compound from Example D is introduced at 20° C. into a mixture of 100 parts of water and 7 parts of cyanamide with thorough stirring, a solution of 43 parts of 4-(β-sulfatoethylsulfonyl)aniline in 100 parts of water having a pH of 6.5 and then 5.9 parts of nicotinamide are subsequently added, and the reaction is carried out at a temperature of 20° to 25° C. and a pH of 6 to 6.5 for about seven hours.

The phthalocyanine compound according to the invention, which, written in the form of the free acid has the formula (16) (for the formula, see formula sheets following the last Example), is isolated in the usual manner from the synthesis solution in the form of the alkali metal salt. It has an absorption maximum in the visible range of 659 nm and has very good fiber-reactive dye properties. It produces, by the dyeing and printing processes customary in industry for fiber-reactive dyes, green to greenish-blue dyeings and prints having high color strength and good fastness properties.

EXAMPLE 44

To prepare a copper phthalocyanine dye according to the invention, the procedure of Example 43 is repeated, except that instead of the neutral solution of 4-(β-sulfatoethylsulfonyl)aniline an aqueous solution containing the same amount of 3-(β-sulfatoethylsulfonyl)aniline is used and moreover the reaction is carried out at a pH of 6.5 and a temperature of 20° to 25° C.

The copper phthalocyanine dye obtained, whose composition, written in the form of the free acid, has the formula (17) (for the formula, see formula sheets following the last Example), likewise has very good fiber-reactive dye properties and dyes, for example, cotton in green to greenish-blue hues of high color strength and good fastness properties. It has an absorption maximum in the visible range at 659 nm.

EXAMPLES 45 TO 62

In the Table Examples which follow, further phthalocyanine dyes according to the invention of the formula (C) (for the formula, see formula sheets following the last Example) are described by means of their formula components. They can be prepared according to the invention, for example using one of the above Working Example, by means of their components apparent from the particular Table Example in combination with the formula (C) (for example a sulfonyl-containing and, if desired, sulfocontaining copper phthalocyanine mono- or dicarbonyl chloride, an amino compound of the formula (5) given in the description and cyanamide). They have fiber-reactive dye properties and produce, by the application and fixation methods customary for fiber-reactive dyes, dyeings and prints of high color strength and good fastness properties, in particular on cellulose fiber materials, in the hue indicated in the particular Table Example for dyeings on cotton.

| Ex. | Radical R⁴ | Index A | Index B | Hue |
|---|---|---|---|---|
| 45 | 2,5-di(β-sulfatoethylsulfonyl)-phenylamino | 1.3 | 1.2 | green (660) |
| 46 | 2-(β-sulfatoethylsulfonyl)-ethylamino | 2 | 0.5 | green (662) |
| 47 | 2-(β-chloroethylsulfonyl)-ethylamino | 1.7 | 0.8 | green (662) |
| 48 | 2-(β-sulfatoethylsulfonyl)-phenylamino | 1.0 | 1.5 | green (663) |
| 49 | 2-methoxy-5-(β-sulfatoethylsulfonyl)phenylamino | 1.1 | 1.4 | green (663) |
| 50 | 2-methoxy-4-(β-sulfatoethylsulfonyl)phenylamino | 1.3 | 1.2 | green (664) |
| 51 | N-ethyl-4-(β-sulfatoethylsulfonyl)phenylamino | 1.0 | 1.5 | green (665) |
| 52 | N-ethyl-3-(β-sulfatoethylsulfonyl)phenylamino | 1.0 | 1.5 | green (665) |
| 53 | 2-sulfo-5-(β-sulfatoethylsulfonyl)phenylamino | 1.3 | 1.2 | green (660) |
| 54 | 2-carboxy-5-(β-sulfatoethylsulfonyl)phenylamino | 1.2 | 1.3 | green (660) |
| 55 | 2-hydroxy-5-(β-sulfatoethylsulfonyl)phenylamino | 1.5 | 1.0 | green (660) |
| 56 | 2-hydroxy-4-(β-sulfatoethylsulfonyl)phenylamino | 1.6 | 0.9 | green (660) |
| 57 | 3-(β-sulfatoethylsulfonyl)-propylamino | 2.0 | 0.5 | green (662) |
| 58 | 3-(β-chlorethylsulfonyl)-propylamino | 1.5 | 1.0 | green (662) |
| 59 | β-[4-(β'-sulfatoethylsulfonyl)phenyl]ethylamino | 2.0 | 0.5 | green (660) |
| 60 | β-[2-sulfo-5-(β'-sulfatoethylsulfonyl)phenyl]ethylamino | 2.0 | 0.5 | green (659) |
| 61 | N,N-bis-[β-(β'-chloroethylsulfonyl)ethyl]amino | 1.5 | 1.5 | green (661) |
| 62 | 3,4-di(β-sulfatoethylsulfonyl)-penylamino | 1.3 | 1.2 | green (660) |

EXAMPLE 63

23.2 parts of the chlorosulfonyl-containing nickel phthalocyanine monocarbonyl chloride compound from Example F in the form of a moist filtercake are stirred in a solution of 43 parts of 4-(p-sulfatoethylsulfonyl)aniline in 100 parts of water having a pH of 6.5, 5.9 parts of nicotinamide are then added, and the reaction is carried out at 20° to 25° C. and a pH of 6 to 6.5 for about seven hours.

The nickel phthalocyanine dye according to the invention, whose composition, written in the form of the free acid, has the formula (18) (for the formula, see formula sheets following the last Example), is isolated in the usual manner from the synthesis solution obtained in the form of the alkali metal salt (sodium salt). It has an absorption maximum in the visible range at 656 nm and has very good fiber-reactive dye properties. It produces, by the dyeing methods customary in industry for fiber-reactive dyes, green dyeings having good fastness properties and in good color yield on the materials mentioned in the description, such as, for example, cotton.

EXAMPLE 64

To prepare a copper phthalocyanine dye according to the invention, the procedure of Example 63 is repeated, except that instead of the neutral solution of 4-($\beta$-sulfatoethylsulfonyl)aniline an aqueous solution containing the same amount of 3-($\beta$-sulfatoethylsulfonyl)aniline is used and moreover the reaction is carried out at a pH of 6.5 and a temperature of 20° to 25° C.

The copper phthalocyanine dye obtained, whose composition, written in the form of the free acid, has the formula (19) (for the formula, see formula sheets following the last Example), likewise has very good fiber-reactive dye properties and dyes, for example, cotton in green to greenish-blue hues of high color strength and good fastness properties. It has an absorption maximum in the visible range at 656 nm.

EXAMPLES 65 TO 82

In the Table Examples which follow, further nickel phthalocyanine dyes according to the invention of the formula (D) (for the formula, see formula sheets following the last Example) are described by means of their formula components. They can be prepared according to the invention, for example using one of the above Working Example, by means of their components apparent from the particular Table Example in combination with the formula (D) (for example a sulfonyl-containing and, if desired, sulfo-containing nickel phthalocyanine mono- or dicarbonyl chloride and an amino compound of the formula (5) given in the description). They have fiber-reactive dye properties and produce, by the application and fixation methods customary for fiber-reactive dyes, dyeings and prints of high color strength and good fastness properties, in particular on cellulose fiber materials, in the hue indicated in the particular Table Example for dyeings on cotton.

| Ex. | Radical R$^4$ | Index A | Index B | Hue |
|---|---|---|---|---|
| 65 | 2,5-di($\beta$-sulfatoethylsulfonyl)-phenylamino | 1.2 | 2.3 | green (658) |
| 66 | 2-($\beta$-sulfatoethylsulfonyl)-ethylamino | 2.0 | 1.5 | green (661) |
| 67 | 2-($\beta$-chloroethylsulfonyl)-ethylamino | 2.0 | 1.5 | green (661) |
| 68 | 2-($\beta$-sulfatoethylsulfonyl)-phenylamino | 1.1 | 2.4 | green (658) |
| 69 | 2-methoxy-5-($\beta$-sulfatoethyl-sulfonyl)phenylamino | 1.3 | 2.2 | green (659) |
| 70 | 2-methoxy-4-($\beta$-sulfatoethyl-sulfonyl)phenylamino | 1.3 | 2.2 | green (659) |
| 71 | N-ethyl-4-($\beta$-sulfatoethyl-sulfonyl)phenylamino | 1.0 | 2.5 | green (659) |
| 72 | N-ethyl-3-($\beta$-sulfatoethyl-sulfonyl)phenylamino | 1.1 | 2.4 | green (659) |
| 73 | 2-sulfo-5-($\beta$-sulfatoethyl-sulfonyl)phenylamino | 1.4 | 2.1 | green (657) |
| 74 | 2-carboxy-5-($\beta$-sulfatoethyl-sulfonyl)phenylamino | 1.3 | 2.2 | green (656) |
| 75 | 2-hydroxy-5-($\beta$-sulfatoethyl-sulfonyl)phenylamino | 1.2 | 1.8 | green (658) |
| 76 | 2-hydroxy-4-($\beta$-sulfatoethyl-sulfonyl)phenylamino | 1.8 | 1.7 | green (658) |
| 77 | 3-($\beta$-sulfatoethylsulfonyl)-propylamino | 2.0 | 1.5 | green (659) |
| 78 | 3-($\beta$-chlorethylsulfonyl)-propylamino | 2.1 | 1.4 | green (659) |
| 79 | $\beta$-[4-($\beta'$-sulfatoethylsulfonyl)-phenyl]ethylamino | 2.0 | 1.5 | green (659) |
| 80 | $\beta$-[2-sulfo-5-($\beta'$-sulfatoethyl-sulfonyl)phenyl]ethylamino | 2.0 | 1.5 | green (659) |
| 81 | N,N-bis-[$\beta$-($\beta'$-chloroethyl-sulfonyl)ethyl]amino | 1.9 | 1.6 | green (660) |
| 82 | 3,4-di($\beta$-sulfatoethylsulfonyl)-penylamino | 1.2 | 2.3 | green (658) |

EXAMPLE 83

23.2 parts of copper phthalocyanine tetracarbonyl chloride in the form of a moist filtercake are stirred into a neutral solution of 43 parts of 4-($\beta$-sulfatoethylsulfonyl)aniline in 100 parts of water. The reaction starts slowly and is carried out at a pH of 6 to 6.5 and a temperature of 20° to 25° C. for about seven hours. The copper phthalocyanine compound according to the invention, which, written in the form of the free acid, has the formula (20) (for the formula, see formula sheets following the last Example), is isolated from the synthesis solution in the usual manner as an alkali metal salt (sodium salt), for example by spray-drying. It has an absorption maximum in the visible range at 680 nm and has very good fiber-reactive dye properties. Green to greenish-blue dyeings and prints of high color strength and good fastness properties are obtained on the fiber materials mentioned in the description, such as, for example, cotton, by the dyeing methods customary for fiber-reactive dyes.

EXAMPLE 84

To prepare a copper phthalocyanine compound according to the invention, the procedure of Example 83 is repeated, except that instead of the starting compound 4-($\beta$-sulfatoethylsulfonyl)aniline the same amount of 3-($\beta$-sulfatoethylsulfonyl)aniline is used, giving a copper phthalocyanine dye according to the invention, which, written in the form of the free acid, has the formula (21) (for the formula, see formula sheets following the last Example), and which has the same good dye properties as the dye from Example 83 and has an absorption maximum in the visible range at 680 nm.

EXAMPLES 85 TO 102

In the Table Examples which follow, further copper phthalocyanine dyes according to the invention of the formula (E) (for the formula, see formula sheets following the last Example) are described by means of their formula components. They can be prepared according to the invention, for example using one of the above Working Example, by means of their components apparent from the particular Table Example in combination with the formula (E) (for example a copper phthalocyanine carbonyl chloride and an amino compound of the formula (5) given in the description). They have fiber-reactive dye properties and produce, by the application and fixation methods customary for fiber-reactive dyes, dyeings and prints of high color strength and good fastness properties, in particular on cellulose fiber materials, in the hue indicated in the particular Table Example for dyeings on cotton.

| Ex. | Radical R⁴ | Index A | Index B | Hue |
|---|---|---|---|---|
| 85 | 3,4-di($\beta$-sulfatoethylsufonyl)-phenylamino | 1.0 | 3.0 | green (680) |
| 86 | 2,5-di($\beta$-sulfatoethylsulfonyl)-phenylamino | 1.0 | 3.0 | green (680) |
| 87 | 2-($\beta$-sulfatoethylsulfonyl)-ethylamino | 1.5 | 2.5 | green (682) |
| 88 | 2-($\beta$-chloroethylsulfonyl)-ethylamino | 1.5 | 2.5 | green (682) |
| 89 | 2-($\beta$-sulfatoethylsulfonyl)-phenylamino | 1.0 | 3.0 | green (680) |
| 90 | 2-methoxy-5-($\beta$-sulfatoethylsulfonyl)phenylamino | 1.1 | 2.9 | green (682) |
| 91 | 2-methoxy-4-($\beta$-sulfatoethylsulfonyl)phenylamino | 1.1 | 2.9 | green (682) |
| 92 | N-ethyl-4-($\beta$-sulfatoethylsulfonyl)phenylamino | 1.0 | 3.0 | green (680) |
| 93 | N-ethyl-3-($\beta$-sulfatoethylsulfonyl)phenylamino | 1.0 | 3.0 | green (680) |
| 94 | 2-sulfo-5-($\beta$sulfatoethylsulfonyl)phenylamino | 1.0 | 3.0 | green (682) |
| 95 | 2-carboxy-5-($\beta$-sulfatoethylsulfonyl)phenylamino | 1.0 | 3.0 | green |
| 96 | 2-hydroxy-5-($\beta$-sulfatoethylsulfonyl)phenylamino | 1.2 | 2.7 | green (683) |
| 97 | 2-hydroxy-4-($\beta$-sulfatoethylsulfonyl)phenylamino | 1.2 | 2.7 | green (683) |
| 98 | 3-($\beta$-sulfatoethylsulfonyl)-propylamino | 1.5 | 2.5 | green (683) |
| 99 | 3-($\beta$-chlorethylsulfonyl)-propylamino | 1.5 | 2.5 | green (683) |
| 100 | $\beta$-[4-($\beta'$-sulfatoethylsulfonyl)-phenyl]ethylamino | 1.5 | 2.5 | green (682) |
| 101 | $\beta$-[2-sulfo-5-($\beta'$sulfatoethylsulfonyl)phenyl]ethylamino | 1.5 | 2.5 | green (682) |
| 102 | N,N-bis[$\beta$-($\beta'$-chloroethylsulfonyl)ethyl]amino | 1.5 | 2.5 | green (682) |

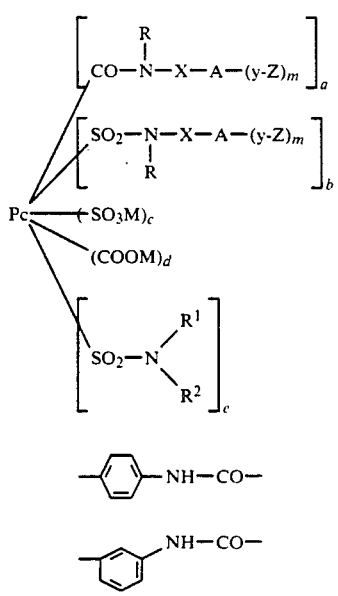

(1)

(2a)

(2b)

-continued

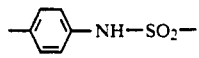 (2c)

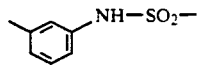 (2d)

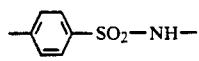 (2e)

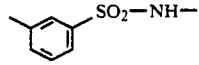 (2f)

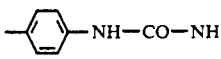 (2g)

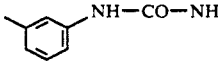 (2h)

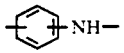 (2j)

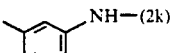 (2k)

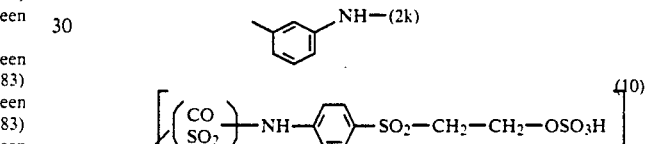 (10)

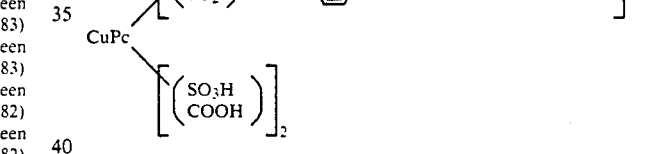 (11)

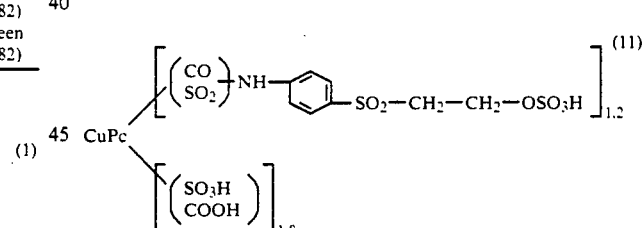 (12)

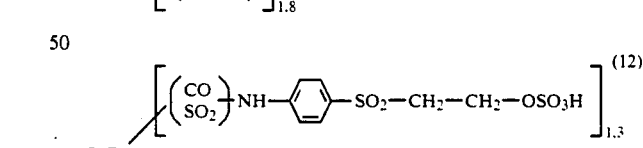 (13)

-continued
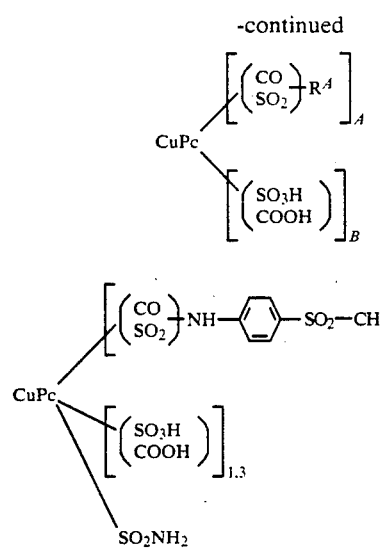
(A)
(14)
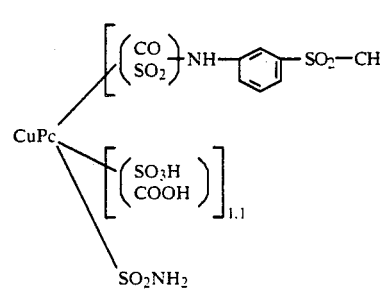
(15)
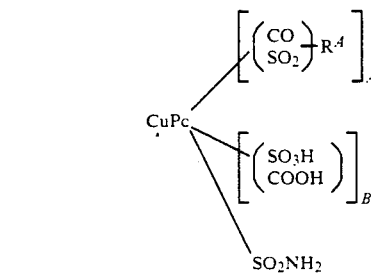
(B)
(16)
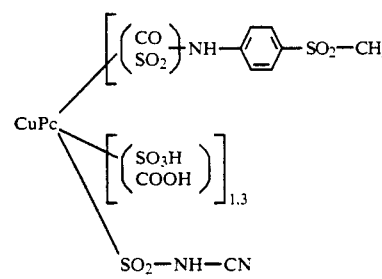
(17)
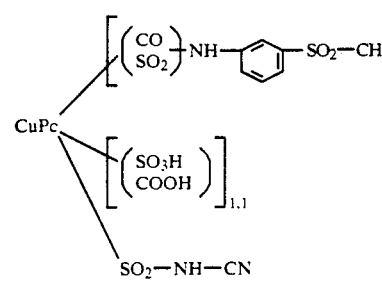
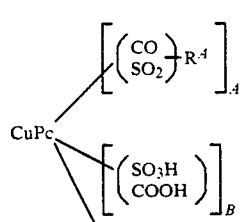
(C)
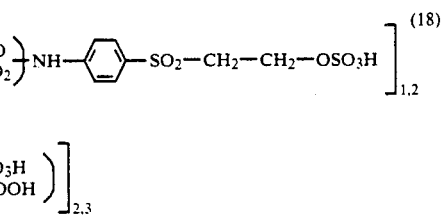
(18)
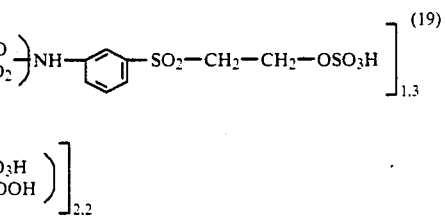
(19)
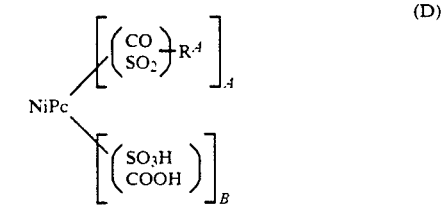
(D)
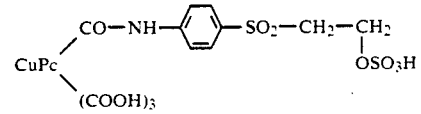
(20)
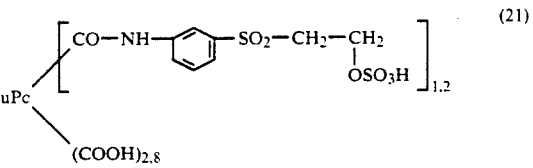
(21)
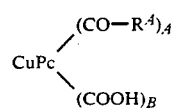
(E)
We claim:
1. A water-soluble phthalocyanine dye conforming the formula (1)

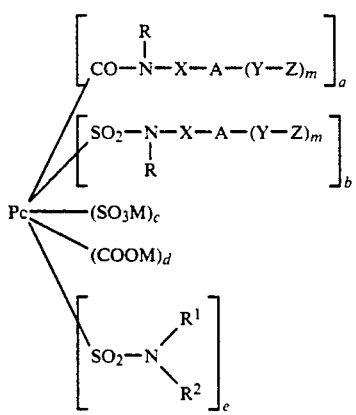 (1)

in which
Pc is the radical of a metal-free or a copper phthalocyanine, cobalt phthalocyanine or nickel phthalocyanine, unsubstituted or additionally substituted in the 3- or 4-positions or both of the carbocyclic aromatic rings of the phthalocyanine by substituents selected from halogen and phenyl, and the chlorosulfonyl, sulfonamide and sulfo groups being bound in the 3- or 4-positions or both of the carbocyclic aromatic rings of the phthalocyanine;

R is hydrogen or lower alkyl of 1 to 6 carbon atoms unsubstituted or substituted by hydroxy, alkoxy of 1 to 6 carbon atoms, chlorine, sulfato, cyano, sulfo, carboxy, phenyl, sulfophenyl and carboxyphenyl;

$R^1$ is hydrogen or alkyl of 1 to 6 carbon atoms unsubstituted or substituted by hydroxy, alkoxy of 1 to 6 carbon atoms, chlorine, sulfato, cyano, sulfo, carboxy, phenyl, sulfophenyl and carboxyphenyl, or is cycloalkyl having 5 to 8 carbon atoms, and $R^2$ is hydrogen or alkyl of 1 to 6 carbon atoms unsubstituted or substituted by hydroxy, alkoxy of 1 to 6 carbon atoms, chlorine, sulfato, cyano, sulfo, carboxy, phenyl, sulfophenyl and carboxyphenyl, or is naphthyl unsubstituted or substituted by sulfo, or is phenyl unsubstituted or substituted by 1 or 2 substituents selected from the group consisting of methyl, ethyl, methoxy, chlorine, carboxy and sulfo or is cyano, or $R^1$ and $R^2$ together with the nitrogen and alkylene of 3 to 8 carbon atoms, or together with a further hetero atom selected from nitrogen or oxygen and two alkylenes of 1 to 4 carbon atoms form the radical of a 4- to 8-membered heterocyclic ring;

A is phenylene or naphthylene, or phenylene or naphthylene substituted each by 1 to 3 substituents selected from the group consisting of alkyl of 1 to 4 carbon atoms, alkoxy of 1 to 4 carbon atoms, halogen, carboxy, nitro and sulfo, or is alkylene of 1 to 8 carbon atoms or alkylene of 2 to 8 carbon atoms which his interrupted by 1 or 2 hetero groups selected from the group consisting of —O— and —NH—;

X is an alkylene radical of 1 to 6 carbon atoms, or an alkyleneamino group of the formula

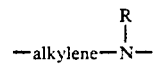

in which
alkylene is an alkylene radical of 1 to 6 carbon atoms, and
R has one of the abovementioned meanings, or is a radical of the formula (2a), (2b), (2c), (2d), (2e), (2f), (2h), or (2j), —(CH$_2$)$_k$— or

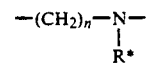

in which
k is an integer from 1 to 5,
n is an integer from 2 to 6, and
R* is a hydrogen atom or an alkyl group of 1 to 5 carbon atoms or
X together with the group —N(R)— forms a group of the formula (3)

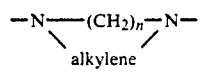 (3)

in which
n is an integer from 2 to 6 and
alkylene is an alkylene of 1 to 6 carbon atoms;
Y is a direct bond or a group of the formula —CO—NH—alkylene—, where alkylene has the above meaning, or is

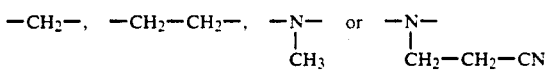

Y is an alkylene of 2 to 6 carbon atoms, in which case the grouping —X—A— as a whole must be a direct bond and m is 2;

Z is vinylsulfonyl or is ethylsulfonyl containing in the β-position a substituent which is eliminated by alkali;
a is an integer from zero to 4;
b is an integer from zero to 3;
c is an integer from zero to 3;
d is an integer from zero to 3;
e is an integer from zero to 2;
the sum of (a+b+c+d+e+) is at most 4;
the sum of (a+b) is 1 to 4;
the sum of (a+d) is 1 to 4;
the sum of (c+d) is zero to 4;
m is the number 1 or 2;
M is a hydrogen atom or an alkali metal.

2. A phthalocyanine dye as claimed in claim 1, wherein X is a direct bond.

3. A phthalocyanine dye as claimed in claim 1, wherein Y is a direct bond.

4. A phthalocyanine dye as claimed in claim 1, wherein m is the number 1.

5. A phthalocyanine dye as claimed in claim 1, wherein b, c and e are each the number zero.

6. A phthalocyanine dye as claimed in claim 1, wherein A is a meta- or paraphenylene radical.

7. A phthalocyanine dye as claimed in claim 1, wherein Z is β-sulfatoethylsulfonyl.

8. A phthalocyanine dye as claimed in claim 1, wherein e is the number zero.

9. A phthalocyanine dye as claimed in claim 1, wherein $R^2$ and $R^1$ are both hydrogen.

* * * * *